May 21, 1929. H. B. PHILIPS 1,713,713
AUTOMOBILE TRANSMISSION
Filed May 11, 1927  2 Sheets-Sheet 2
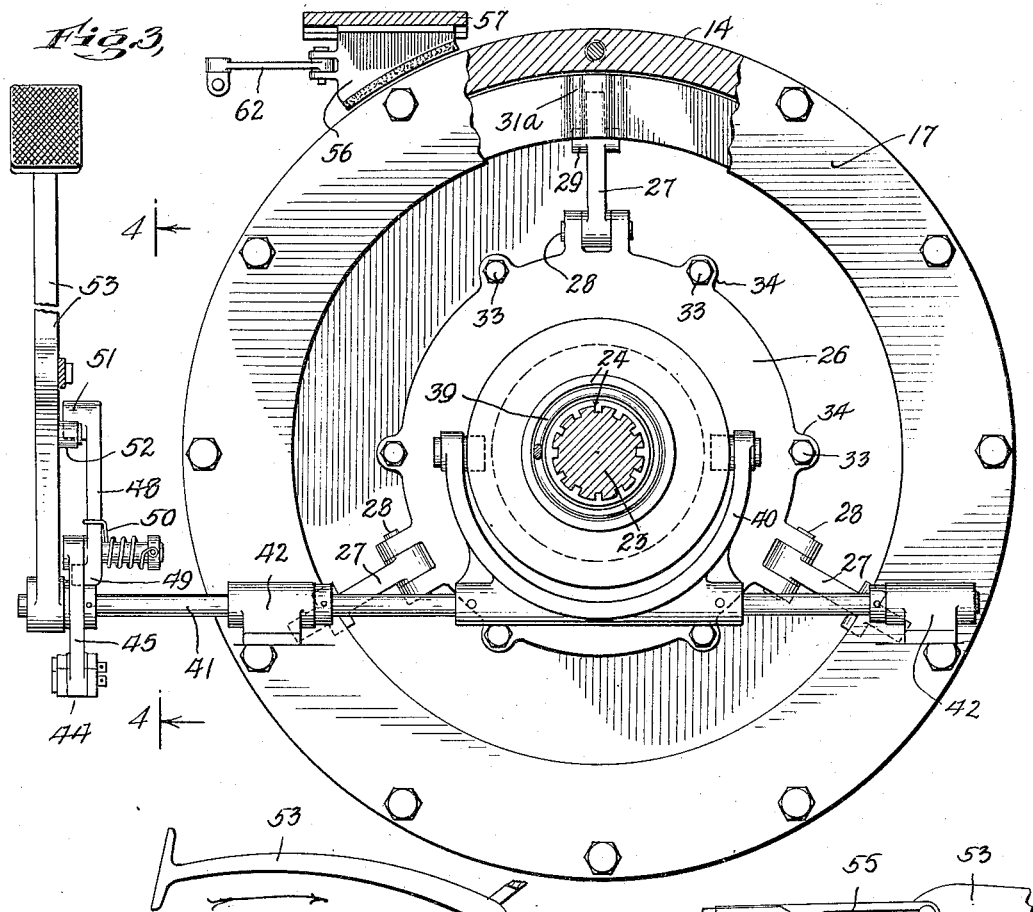
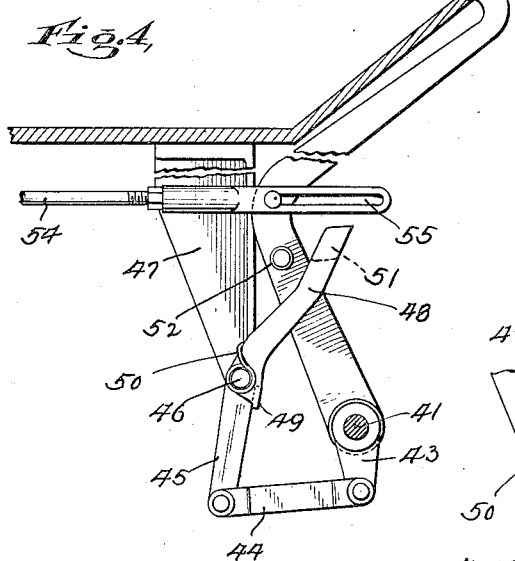
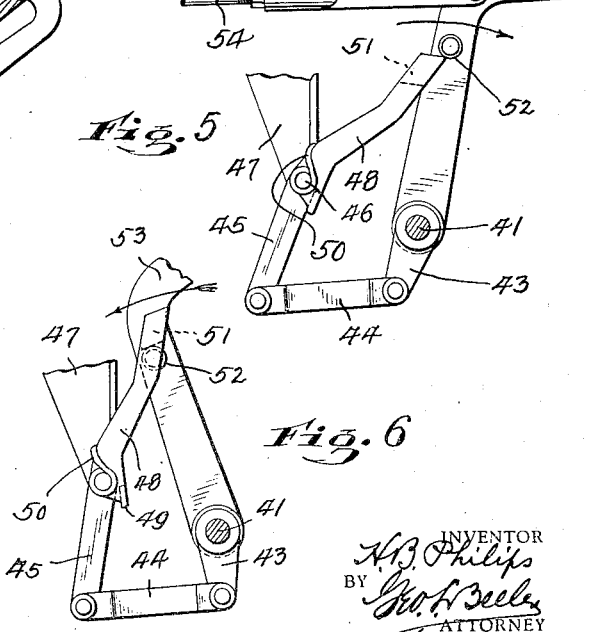
INVENTOR
H. B. Philips
BY Geo. L. Beeler
ATTORNEY Patented May 21, 1929.

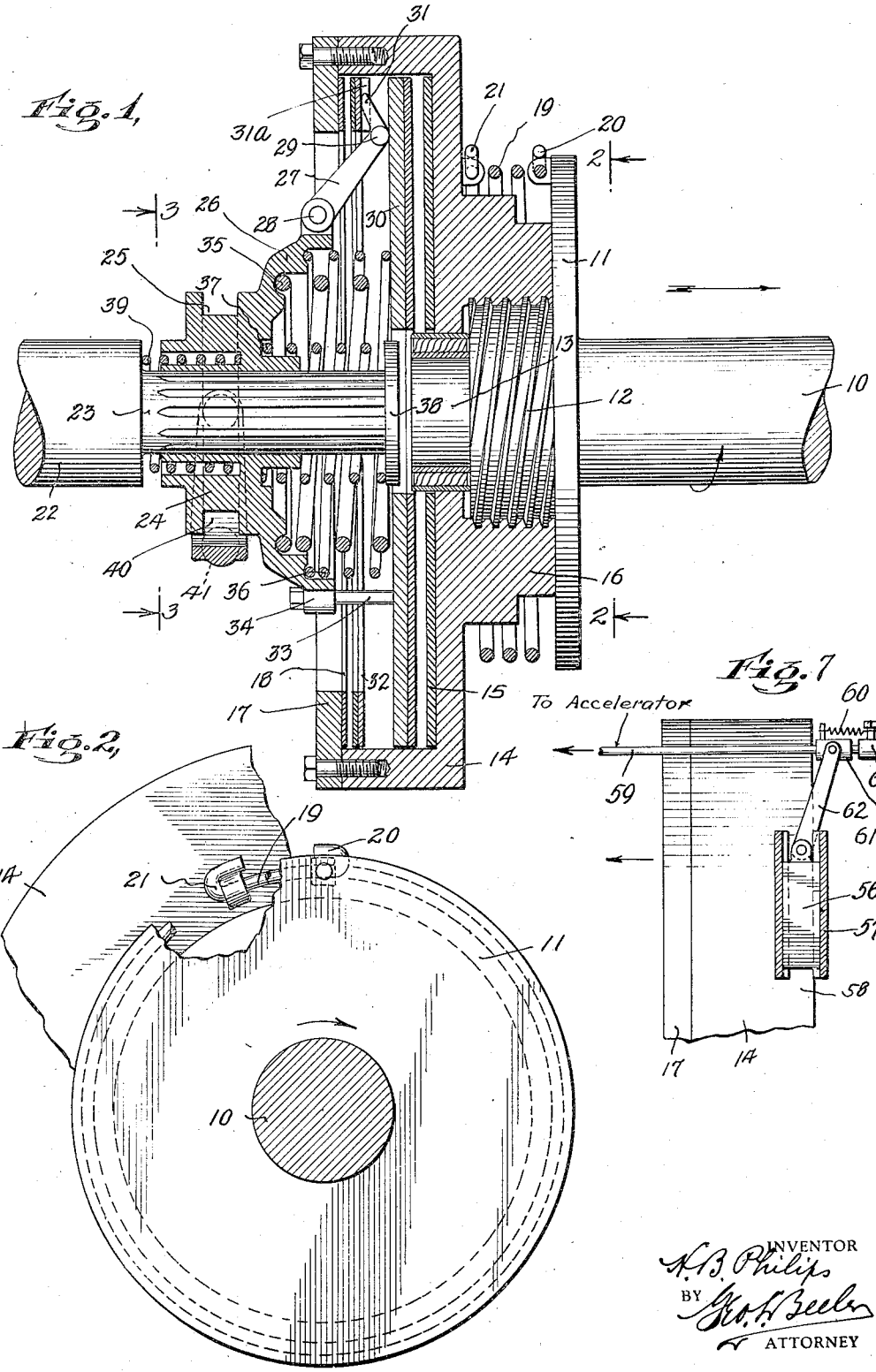

1,713,713

UNITED STATES PATENT OFFICE.

HERMAN B. PHILIPS, OF NEW YORK, N. Y.

AUTOMOBILE TRANSMISSION.

Application filed May 11, 1927. Serial No. 190,428.

This invention relates to transmission mechanism and while it has particular reference to the transmission of power between the engine and the running gear of an automobile, it is to be understood that it might be employed to good advantage in many other lines of machinery.

Among the objects of the invention is to provide transmission mechanism between the driving and driven shafts of an automobile which includes a clutch device that is normally free as distinguished from the clutch of the usual transmission mechanism which is normally set and is released only by the application of the driver's foot.

Another object of the invention is to provide a transmission device for the communication of power from the driving shaft to the driven shaft including clutch mechanism that is set or gripped as a result of the speeding up of the motor and motor shaft and coincident with the feeding of gas to the motor.

A still further object of the invention is to provide a clutch mechanism for transmission gearing which includes a fly wheel having a clutching surface, the fly wheel being so connected or associated with the driving shaft as to be speeded up following the starting of the motor and at the same time is caused to move lengthwise of the driving shaft to bring the clutch surface into action with a corresponding clutching surface carried by the driven shaft, and means to resiliently cushion the driving connection between the driving shaft and the fly wheel first mentioned and for restoring the fly wheel to its normal position when the driving shaft is retarded in its rotation from any cause.

A still further object of the invention is to provide additional clutch mechanism with associated clutch lever mechanism so as to insure perfect control of the machine when running down grade, stopping, or at any time when the machine is overrunning the motor.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a vertical longitudinal section through the main parts of the clutch mechanism, the direction of movement of the machine being toward the right.

Fig. 2 is a vertical transverse section on the line 2—2 of Fig. 1.

Fig. 3 is a vertical transverse section on the line 3—3 of Fig. 1.

Figs. 4, 5, and 6 are detail views in side elevation as from the plane of the line 4—4 of Fig. 3, showing the different positions of the foot lever mechanism.

Fig. 7 is a detail view of the initial gripper mechanism for the fly wheel shown in the nature of a wedge.

Referring now more specifically to the drawings, 10 indicates a motor shaft having a disk-like collar 11, an externally threaded hub 12, and a bearing or hub extension 13 at its rear end. These parts are all connected rigidly together by any suitable means.

14 indicates a fly wheel or clutch shell having a flat clutch face 15 and a hub portion 16 having threaded engagement with the hub 12 and with a quick pitch thread. Secured to the rear edge of the rim of the fly wheel 14 is an annulus 17 having an auxiliary clutch surface 18 opposed to and spaced from the clutch face 15.

19 indicates a spiral spring having its ends connected at 20 and 21 to the periphery of the disk or collar 11 and the fly wheel, respectively. The direction of the motor shaft being as indicated by the arrow thereon and the fly wheel tending to remain stationary momentarily because of its inertia of rest, the first effect of the rotation of the driving shaft 10 is to rotate the hub 12 within the hub 16 of the fly wheel, causing thereby the fly wheel to be forced rearward away from the disk 11 as a result of the action of the threads on the hub 12. At the same time the spring 19 is wound up or placed under tension, such tension remaining stored up in the spring until the power or speed of the engine is reduced at which time the unwinding or recoiling of the spring 19 will restore or tend to restore the fly wheel to its normal forward position as shown in Fig. 1.

In alignment with the driving shaft is the driven shaft 22 having a reduced forward end 23 upon which is slidably and non-rotatably mounted a sleeve 24 which constitutes a yoke collar having a groove 25 and also a hub portion or spider 26 which carries a plurality of bell crank levers 27 pivoted at 28 and projecting radially outward and forward and having their fulcrums or bearings 29 bearing against the rear surface of the clutch disk 30 located within the fly wheel and spaced normally slightly rearward from the clutch face 15. The outer or toe portions 31 of the bell cranks have rearward bearing contact against a clutch ring 32 opposed to and having co-operation with the clutch ring or surface 18 of the annulus 17. The clutch disk 30 is supported upon a series of pins 33 fixed to the disk and having rearward slidable movement in lugs 34 carried by the spider 26. Any suitable number, design, or arrangement of cushioning means such as a series of coil springs 35, 36, and 37 may be interposed between the spider or sleeve 24 and the clutch disk 30. The spring 35 is shown as the strongest and tends to keep the sleeve and disk separated. The spring 37 bears at one end against the sleeve and at the other end against a cap 38 carried by the front end of the driven shaft. The spring tends to hold the sleeve forced rearward along the driven shaft and is superior in strength to another spring 39 located between the sleeve and the main portion of the driven shaft and acting as a cushion resisting moderately the rearward movement of the sleeve. The bearings 29 of the bell cranks 27 have slidable as well as rolling contact with the rear surface of the disk 30, and when the sleeve 24 and disk 30 are brought relatively toward each other, the main arms of the bell cranks 27 approach parallelism with the disk 30, causing the bearings 29 to move outward toward the periphery of the disk 30, and the toe portions 31 to swing rearward with the tendency to force the clutch ring 32 into co-operation with the clutch surface 18. This relative movement of the sleeve 24 and disk 30 may be effected in various ways. The usual procedure is for this result to be effected because of the rearward movement of the fly wheel and the contact between the clutch face 15 and the clutch disk, such movement of the fly wheel being sufficient to eventually cause the disk 30 to move rearward and produce the result just described with respect to the auxiliary clutch.

Co-operating with the annular groove 25 of the sleeve 24 is a yoke 40 fixed upon a rock shaft 41 journaled in any suitable bearings 42 at the rear of the clutch mechanism. To the rock shaft 41 is fixed a short lever or arm 43 from which a link 44 leads to an arm 45 journaled at a fixed point 46 upon a bracket 47, and associated with which arm 45 is an arm 48 having what may be termed a rule joint connection at 49 with the arm 45 and having a spring 50 tending to maintain a stiff joint between the two arms 45 and 48 as shown in Figs. 4 and 5. The arm 48 has a head or lug 51 with which co-operates a roller 52 mounted upon a foot lever 53 journaled loosely upon the rock shaft 41. 54 indicates a brake rod connection having a pin and slot connection at 55 with the foot lever 53.

Whenever desired, as when the car is traveling down grade or tends to overrun the speed of the motor and at which time the fly wheel will probably occupy its normal forward position as shown in Fig. 1, and with the main clutch members disconnected, the driver by pressing forward on the foot lever will cause the same to approach or assume the position of Fig. 5 at which time the roller 52 will strike and wipe against the lug or head extension 51 of the combined arms 45 and 48 and cause, through the link 44, the swinging of the short arm 43 toward the rear or to the left in Fig. 5, and the rocking of the shaft 41 and the throwing of the yoke 40 to the right in Fig. 1 or forward, causing thereby the movement of the sleeve 24 forward and thereby constituting another means for bringing the sleeve 24 and disk 30 into proximity to each other. Consequently both the auxiliary clutches 18 and 32 and the main clutch 15, 30 will be set, thereby coupling the engine with the driven mechanism and constituting the engine a braking means as is well known in automobile driving, this taking place in connection with the direct control of the foot brake through the continued pressure of the foot forward against the foot lever 53. When the lever 53 is pushed forward to its maximum the roller 52 will pass the head 51 of the arm 48 and when the foot lever returns again to normal position, the roller 52 will roll under the extension 51 as shown in Fig. 6, the joint at 46 breaking against the force of the spring 50 so as to allow the roller 52 to pass beyond the extension 51 and back to normal position as shown in Fig. 4.

Should the spring 19 under any circumstances be too strong to permit the necessary retardation of the fly wheel with respect to the driving shaft to effect the action of the screw threaded hub and setting of the clutch, I may use auxiliary means to hold more or less positively the fly wheel from rotation initially. For this purpose I indicate in Figs. 3 and 7 a gripping mechanism including a wedge or shoe 56 having slidable support along a shelf 57 and adapted to be brought into frictional contact with the side portion of the periphery of the fly wheel as indicated at 58 when and only when the fly wheel occupies its forward position. The wedge 56 may be manipulated by any convenient means for which purpose I show a rod 59 which is associated with the accelerator mechanism and which consequently is actuated in the direction of the arrow of Fig. 7 coincident with the actuation of the accelerator. This movement of the rod 59 is resisted by means of any suitable spring attached thereto, not shown, and which resists the actuation of the accelerator in a well known manner. 60 indicates a spring connecting a stop or anchor 61 to a slidable sleeve 61ª and to which the link 62 is connected. The adjustment of the sleeve 61 is determined according to the condition of the weather or other circumstances affecting the operation of the accelerator. When the rod is actuated a link 62 acting as a toggle drives the wedge 56 into gripping engagement with the fly wheel. Obviously since the fly wheel is retarded with respect to the motion of the driving shaft, the threads at 12 cause the driving of the fly wheel rearward as above described and automatically takes the fly wheel out from under the shoe 56. The shoe is returned to its normal position as a result of the return of the fly wheel to its normal forward position in its proper timely recoil of the spring 19.

The toe portions 31 of the bell cranks lie in grooves or depressions 31ª of the auxiliary clutch so as to keep these parts in constant connection with one another. The slotted portion of the rod 54 is adjustable to vary the effective length of the rod for proper setting of the mechanism, and I wish to point out also that the foot lever 53 must be properly adjusted with respect to the arms 45 and 48 so that when the roller 52 begins to roll along the top of the head 51, the foot lever will have commenced to act upon the brake through the rod 54. Consequently, while the roller 52 is rolling along the upper surface of the head 51, the brake is being set by the foot and will be so maintained while the foot lever is held forward even through the roller 52 is no longer active upon the clutch setting mechanism. It follows therefore that by the actuation of a single foot lever, the clutch and brake mechanisms are both adapted to be operated,—a part of the time together, and the foot brake mechanism always under the control of the foot.

On starting the motor, the rotation of hub 12 in the stationary flywheel 14, will, due to the direction of the threads on said hub, cause said flywheel to move rearward or away from member 11, so that the clutch face 15 will engage clutch disk 30 and move the latter in a corresponding direction, and in turn the bell crank levers 27 to move the member 32 into clutch engagement with the member 18. The flywheel then comes to a stop as far as movement along said shaft is concerned. But the continued rotation of the shaft 10 will rotate the flywheel through the engaging hub 12, and the flywheel will in turn transmit rotation through the rods 33 to the driven shaft 22. Where, however, the car speeds ahead of the motor, the inertia of the flywheel will cause the same to move on the threaded hub toward member 11 to disengage the clutch disk 30, and this action is aided by the spring 19. On speeding up the motor, the clutch disc is again engaged as aforesaid.

The clutch 18, 32 provides a gripping action auxiliary to that of the main clutch 15, 30. There is also another purpose served by the clutch 18, 32 in that the bell crank levers 27 are thus caused to act between the said clutches in the manner of wedges and thus greatly increase the gripping action of the invention.

I claim:

1. In transmission mechanism, the combination of a driving shaft, a driven shaft, clutch mechanism between the shafts, mechanism serving to cause the setting of the clutch whenever the driving shaft speeds up ahead of the driven shaft, said clutch mechanism comprising a rotary member having two spaced opposed clutch surfaces, a pair of other clutch surfaces interposed between the first mentioned pair, and having cooperation with the first pair respectively, and mechanism between the elements of the second pair of clutch members tending to support them and to bring them respectively into co-operation with the elements of the first mentioned pair.

2. Mechanism as set forth in claim 1 in which the mechanism for setting the several pairs of clutch members includes a series of bell crank levers having slidable and rolling contact with both members of the second pair of clutch members.

3. Mechanism as set forth in claim 1 in which the means for spreading the second pair of clutch members includes a combination sleeve and spider slidable upon the driven shaft and held from rotation thereon, and a series of bell crank levers journaled upon the spider and extending thence radially outward and having fulcrum and toe contact with the elements of the second pair of clutch members respectively.

4. In transmission mechanism, the combination of a driving shaft having a threaded hub, a fly wheel journaled upon the driving shaft and having a clutch surface, a driven shaft, clutch mechanism mounted upon the driven shaft and co-operating with said clutch surface, means to cause the setting of the clutch as a result of and coincident with the speeding up of the driving shaft ahead of the driven shaft, and means to move said clutch mechanism independent of the speeding up of the driving shaft to cause the clutch to engage the shafts together.

5. In braking mechanism for automobiles, a driving shaft, a driven shaft, clutch mechanism between the two shafts whereby the driven shaft may be coupled to the driving shaft for bringing the engine into action as a brake, a brake lever for the actuation of a different braking mechanism, and mechanism actuated by the brake lever for setting the clutch mechanism aforesaid, said clutch mechanism being normally engaged as a result of a speeding up of the driving shaft, and released automatically as the engine speed drops below that of the driven shaft.

6. Mechanism as set forth in claim 5 in which the mechanism actuated by the brake lever serves to bring into action the clutch mechanism preliminary to the setting of the regular brake mechanism.

7. In transmission mechanism, the combination of a driving shaft having a threaded hub, a fly wheel journaled upon the driving shaft and having a clutch surface, a driven shaft, clutch mechanism mounted upon the driven shaft and co-operating with said clutch surface, means to cause the setting of the clutch as a result of and coincident with the speeding up of the driving shaft ahead of the driven shaft, the driving shaft being provided with a collar fixed thereto, and a spiral cushion spring anchored at its respective ends to said collar and fly wheel, the spring having tension stored up therein when the driving shaft speeds ahead of the driven shaft.

8. In transmission mechanism, the combination of a driving shaft having a threaded hub, a fly wheel journaled upon the driving shaft and having a clutch surface, a driven shaft, clutch mechanism mounted upon the driven shaft and co-operating with said clutch surface, means to cause the setting of the clutch as a result of and coincident with the speeding up of the driving shaft ahead of the driven shaft, the fly wheel having a smooth cylindrical periphery and gripping mechanism provided to grip said periphery to insure the retardation of the fly wheel while the driving shaft is speeding up and automatically releasing its grip upon the fly wheel after being initially gripped.

9. In transmission mechanism, the combination of a driving shaft having a threaded hub, a driven shaft, a clutch member carried upon the driving shaft and having limited independent rotation thereon, clutch connections between the driven shaft and the clutch member aforesaid, said clutch member having a threaded portion mating with the threaded hub of the driving shaft, whereby when the driving shaft is speeded up, the threaded hub thereof will cause the setting of the clutch mechanism and coupling of the driven shaft with the driving shaft, resilient cushioning mechanism between the driving shaft and the clutch member so as to cushion the relative movements of the driving shaft and clutch member and tending to return the clutch member to normal position on the slowing down of the driving shaft.

10. In transmission mechanism, the combination with a driving shaft, a driven shaft, clutch means between the driving and driven shafts, and means serving to set the clutch mechanism directly as a result of the speeding up of the driving shaft ahead of the driven shaft, of auxiliary clutch mechanism serving to perpetuate the setting of the clutch mechanism after the speed of the driving shaft becomes reduced below that of the driven shaft, the means for actuating the auxiliary clutch mechanism being a lever having connection with brake mechanism in addition to connections direct with the clutch mechanism, means being provided permitting consecutive action of the clutch, brake and clutch, and brake alone.

In testimony whereof I affix my signature.

HERMAN B. PHILIPS.